United States Patent
Lam et al.

(10) Patent No.: US 7,476,468 B1
(45) Date of Patent: Jan. 13, 2009

(54) FLAME RETARDANT BATTERY

(75) Inventors: Phuong-Nghi Karen Lam, Glendale, CA (US); Mikito Nagata, Saugus, CA (US); Hisashi Tsukamoto, Santa Clarita, CA (US)

(73) Assignee: Quallion LLC, Sylmar, CA (US)

( * ) Notice: Subject to any disclaimer, the term of this patent is extended or adjusted under 35 U.S.C. 154(b) by 441 days.

(21) Appl. No.: 11/272,261

(22) Filed: Nov. 10, 2005

(51) Int. Cl.
*H01M 6/16* (2006.01)

(52) U.S. Cl. .................. 429/326; 429/330; 429/338; 429/342

(58) Field of Classification Search ............. 429/326, 429/324, 330, 338, 342
See application file for complete search history.

(56) References Cited

U.S. PATENT DOCUMENTS

6,210,835 B1 4/2001 Arai

*Primary Examiner*—Patrick Ryan
*Assistant Examiner*—Thomas H. Parsons
(74) *Attorney, Agent, or Firm*—Gaurilovich, Dodd & Lindsey, LLP (57) ABSTRACT

The battery has an electrode assembly that includes one or more anodes and one or more cathodes. A first liquid phase is positioned in an active region of the electrode assembly. The first liquid phase includes one or more first flame retardants and an electrolyte. A second liquid phase is outside of the active region and in contact with the first liquid phase. The second liquid phase includes one or more second flame retardants. A third liquid phase is outside of the active region and in contact with the second liquid phase. The third liquid phase includes one or more third flame retardants. The first liquid phase and/or the electrolyte have a density between the second liquid phase and the third liquid phase.

56 Claims, 5 Drawing Sheets

FLAME RETARDANT BATTERY

TECHNICAL FIELD

This invention relates to batteries and more particularly to batteries having a reduced flammability.

BACKGROUND

The increasing demand for batteries with higher energy densities has resulted in the presence of highly energetic active substances in confined volumes. As a result, large amounts of energy can be released when these batteries short-circuit or otherwise fail. For instance, batteries are known to ignite and catch fire as a result of piercing and/or compression. As a result, there is need for safe batteries that can satisfy the demands for increased energy density.

SUMMARY

A battery is disclosed. The battery includes an electrode assembly having one or more anodes and one or more cathodes. The battery also includes a first liquid phase in an active region of the electrode assembly. The first liquid phase includes an electrolyte. The battery also includes a second liquid phase in contact with the first liquid phase and liquid-liquid separated from the first liquid phase. The second liquid phase includes one or more second flame retardants. A third liquid phase is outside of the active region and in contact with the second liquid phase. The third liquid phase includes one or more third flame retardants. The first liquid phase and/or the electrolyte has a density greater than a density of the third liquid phase. In some instances, the second liquid phase has a density that is greater than the density of the third liquid phase. The first liquid phase can have a density between the second liquid phase and the third liquid phase.

One embodiment of the battery includes a plurality of second flame retardants and/or a plurality of third flame retardants. In some instances, at least one second flame retardant has a boiling point greater than 60° C., or 80° C. and/or less than 120° C., or less than 180° C. at 1 atm and at least one third flame retardant has a boiling point greater than 60° C., or 80° C. and/or less than 120° C., or less than 180° C. at 1 atm.

Another embodiment of the battery is disclosed. The battery includes an electrode assembly having a shut-down separator between an anode and a cathode. The battery also includes a first liquid phase in an active region of the electrode assembly. The first liquid phase includes an electrolyte. The battery also includes a second liquid phase in contact with the first liquid phase. The second liquid phase includes one or more second flame retardants. The battery also includes a third liquid phase in contact with the second liquid phase. The third liquid phase includes one or more third flame retardants. At least one third flame retardant and/or at least one third flame retardant has a boiling point higher than the boiling point of the electrolyte and lower than a threshold temperature at which the shut-down separator is activated.

Suitable second flame retardants can be perfluorocarbons and/or compounds selected from a group consisting of alkanes, ethers, ketones, and amines substituted with one or more alkyl groups where the compound is more than 60% fluorinated. In some instances, at least one second flame retardant is a ketone represented by R'(C═O)R" wherein R' is a perfluoroalkyl group and R" is a perfluoroalkyl group or an alkyl group. The ketone can be perfluoroketone such as dodecafluoro-2-methylpentan-3-one. In some instances, at least one second flame retardant is an ether represented by R'OR" wherein R' is a perfluoroalkyl group and R" is a perfluoroalkyl group or an alkyl group. The ether can be a segregated hydrofluoroether such as methoxy-heptafluoropropane, methoxy-nonafluorobutane, ethoxy-nonafluorobutane, perfluorohexylmethylether, and 2-trifluoromethyl-3-ethoxydodecofluorohexane. In some instances, the second phase and the one or more second flame retardants exclude ethers and specifically fully or partially halogenated ethers. In some instances, at least one second flame retardant is an amine substituted with one or more perfluoroalkyl groups such as perfluorotripentylamine, perfluorotributylamine, perfluorotripropylamine and perfluoro-n-dibutylmethylamine. In some instances, at least one second flame retardant is a perfluoroalkane such as perfluoropentane, perfluorohexane, perfluoroheptane, perfluoroctane, and perfluoro-1,3-dimethylcyclohexane.

Suitable third flame retardants can be perfluorocarbons and/or compounds selected from a group consisting of alkanes, ethers, ketones, and amines substituted with one or more alkyl groups where the compound is more than 60% fluorinated. In some instances, at least one third flame retardant is a ketone represented by R'(C═O)R" wherein R' is a perfluoroalkyl group and R" is a perfluoroalkyl group or an alkyl group. The ketone can be perfluoroketone such as dodecafluoro-2-methylpentan-3-one. In some instances, at least one third flame retardant is an ether represented by R'OR" wherein R' is a perfluoroalkyl group and R" is a perfluoroalkyl group or an alkyl group. The ether can be a segregated hydrofluoroether such as methoxy-heptafluoropropane, methoxy-nonafluorobutane, ethoxy-nonafluorobutane, perfluorohexylmethylether, and 2-trifluoromethyl-3-ethoxydodecofluorohexane. In some instances, the third phase and the one or more third flame retardants exclude ethers and specifically fully or partially halogenated ethers. In some instances, at least one third flame retardant is an amine substituted with one or more perfluoroalkyl groups such as perfluorotripentylamine, perfluorotributylamine, perfluorotripropylamine and perfluoro-n-dibutylmethylamine. In some instances, at least one third flame retardant is a perfluoroalkane such as perfluoropentane, perfluorohexane, perfluoroheptane, perfluoroctane, and perfluoro-1,3-dimethylcyclohexane.

In some instances, the first liquid phase includes one or more first flame retardants. Suitable first flame retardants include, but are not limited to, phosphazenes including cyclic phosphazenes such as cyclotriphosphazene. The cyclic phosphazenes can be fully or partially halogenated. For instance, the cyclic phosphazenes can be fully or partially fluorinated. Additionally or alternately, the cyclic phosphazenes can have one or more substituents selected from a group consisting of linear or cyclic alkyl groups, alkoxy groups, cycloalkoxy groups, and aryloxy groups. The substituents can be unhaloghenated, fully halogenated or partially halogenated. In some instances, the cyclic phosphazenes are fully substituted with halogens and substituents selected from a group consisting of linear or cyclic alkyl groups, alkoxy groups, cycloalkoxy groups, and aryloxy groups.

Methods of generating the above batteries are also disclosed.

DETAILED DESCRIPTION

A battery is disclosed. The battery has an electrode assembly that includes a plurality of electrodes. The electrodes include one or more anodes and one or more cathodes. A separator(s) is/are positioned between adjacent anodes and cathodes in the electrode assembly. The battery includes a first liquid phase that includes an electrolyte having one or more salts dissolved in a solvent. The battery also includes a second liquid phase in contact with the first liquid phase and liquid-liquid phase separated from the first liquid phase. The second liquid phase includes or consists of one or more second flame retardants. The battery also includes a third liquid phase in contact with the second liquid phase and liquid-liquid phase separated from the second liquid phase. The third liquid phase includes or consists of one or more third flame retardants.

The electrode assembly includes an active region inside the perimeter of the electrode assembly. The battery energy is generated in the active region by redox reactions at the electrodes accompanied by migration of ions between the electrodes. The first liquid phase can be positioned in the active region of the electrode assembly such that the electrolyte activates the one or more anodes and the one or more cathodes. The second liquid phase and the third liquid phase can be positioned outside of the active region. This arrangement allows the one or more second flame retardants and the one or more third flame retardants to be positioned outside of the active region of the electrode assembly.

The first liquid phase and/or the electrolyte can have a density between the density of the second liquid phase and the density of the third liquid phase. When a battery does not employ the third liquid phase and the electrolyte escapes the active region, the electrolyte can rise to the top of the second liquid phase and rest on top of the second liquid phase where it can readily ignite. When the electrolyte escapes from the active region of a battery having an electrolyte with a density between the density of the second liquid phase and the density of the third liquid phase, the electrolyte rises through the second liquid phase to the interface between the second liquid phase and the third liquid phase but does not rise through the third liquid phase. Because the electrolyte remains between the second liquid phase and the third liquid phase, the flame retardants reduce the volatility of the electrolyte. As a result, the presence of the third liquid phase further reduces the volatility of the battery.

In some instances, the one or more second flame retardants include one or more low boiling point flame retardants with a boiling point greater than 60° C., or 80° C. and/or less than 120° C., or 180° C. at 1 atm. Additionally or alternately, the one or more third flame retardants can include one or more low boiling point flame retardants with a boiling point greater than 60° C., or 80° C. and/or less than 120° C., or 180° C. at 1 atm. Suitable flame retardants can stop or reduce battery volatility by several different mechanisms. The flame retardant can have a high heat capacity in its liquid phase to absorb heat from the battery and slow down the thermal runaway reaction. The flame retardant can also be selected to start boiling near the battery exothermic reaction temperature. This change of phase from the liquid to gas state also absorbs heat and can slow down or even shut down that exothermic reaction. The evaporated flame retardant can also create a gaseous mixture in the adjacent atmosphere. This gaseous mixture containing the flame retardant can have a higher heat capacity than the atmosphere alone, and can cool down the combustion zone of the battery and prevent further reactions. As a result, the boiling point of a flame retardant that employs this mechanism to suppress volatility affects the temperature at which the flame retardant becomes effective. The boiling point of a flame retardant that employs this mechanism to suppress volatility can be lower than the temperature at which the exothermic reaction occurs to ensure that the flame retardant become effective before the volatility occurs.

The inventors have employed differential scanning calorimetry to explore the thermal characteristics of active material and electrolyte combinations. The inventors have found that common charged batteries using $LiCoO_2$ cathode active material, graphite as anode active materials, and 1M $LiPF6$ EC/DMC/DEC electrolyte can have highly exothermic reactions when they short-circuit or are exposed to extreme conditions. The thermal runaway mechanism is a chain reaction where the initial trigger is the exothermic reaction between the anode active material and electrolyte at around 120° C. The second exothermic reaction involves the cathode active material and the electrolyte at around 180-300° C. The third exothermic reaction comes from the anode active material and electrolyte at around 350° C. It is believed that this thermal runaway of the battery can be alleviated by either preventing the initial triggering reaction of the anode at around 120° C. or by stopping the chain reaction between 120° C. and 180° C. As a result, one or more of the second flame retardants and/or one or more of the third flame retardants can have a boiling point lower than the runaway temperature of the battery. The one or more second flame retardants and/or one or more of the third flame retardants can also include one or more flame retardants with a boiling point higher than the runaway temperature of the battery to address the reactions after the triggering reaction. The runaway temperature for a battery is the onset temperature for exothermic behavior resulting in catastrophic failure of the battery. The runaway temperature can be determined from the adiabatic self-heating rate of the battery (dT/dt) as determined from accelerated rate calorimetry. The runaway temperature can be identified as the temperature where a sharp increase in the self-heating rate is associated with catastrophic failure of the battery. Since secondary batteries are generally charged to less than theoretical capacity to promote longer cycle life and higher safety during normal use, the runaway temperature of the battery can be the runaway temperature of the battery when the battery is charged to 60% of the theoretical capacity of the limiting electrode. Accordingly, the self-heating rate data can be generated for a battery charged to 60% of the theoretical capacity of the limiting electrode.

For the example of batteries using $LiCoO_2$ cathode active material, graphite as anode active materials, and 1M LiPF6 EC/DMC/DEC electrolyte, the one or more second flame retardants can include one or more low boiling point flame retardants with a boiling point less than 120° C. at 1 atm, or between 120° C. and 180° C. at 1 atm. Additionally or alternately, the one or more third flame retardants can include one or more low boiling point flame retardants with a boiling point less than 120° C. at 1 atm, or between 120° C. and 180° C. at 1 atm. As a result, at least one of the second flame retardants and/or at least one of the third flame retardants can have a boiling point less than 350° C. and more preferably less than 120° C., so the flame retardant is present in the atmosphere before the reaction occurs at 120° C., and/or at least one of the second flame retardants and/or at least one of the third flame retardants can have a boiling point between 120° C. and 180° C., to stop the chain reaction between 120° C. and 180° C. Because the use of one or more second flame retardants and/or one or more third flame retardants with a boiling point less than 120° C. may be effective for the thermal release of both the anode active materials and the cathode active materials, at least one of the second flame retardants and/or at least one of the third flame retardants preferably has a boiling point less than 120° C.

Because batteries are normally used in a temperature range below 80° C., at least one of the second flame retardants and preferably all of the second flame retardants can have a boiling point greater than 80° C. to prevent the second flame retardant from evaporating during normal use of the battery. Additionally or alternately, at least one of the third flame retardants and preferably all of the third flame retardants can have a boiling point greater than 80° C. to prevent the third flame retardant from evaporating during normal use of the battery. As a result, a second liquid phase with second flame retardants having a boiling point between 80° C. and 120° C. combined with a third liquid phase with third flame retardants having a boiling point between 80° C. and 120° C. permits use of the battery within the normal operating range.

As a result of the fire retarding mechanism employed by many of the second flame retardants, a second flame retardant and/or a third flame retardant with reduced heats of vaporization and elevated vapor pressures may provide the most effective flame retardation. In some instances, all or a portion of the second flame retardants have a heat of vaporization lower than 150 J/g at boiling point and 1 atm, or 105 J/g at boiling point and 1 atm, and/or a vapor pressure greater than 0.01 kPa at 25° C., or 1 kPa at 25° C. In some instances, all or a portion of the second flame retardants can have heat capacities higher than 500 J/kg° C. at 25° C., higher than 800 J/kg° C. at 25° C., or higher than 1000 J/kg° C. at 25° C. A second flame retardant with an elevated heat capacity can absorb additional heat from the electrode assembly when in the liquid state. In some instances, all or a portion of the third flame retardants have a heat of vaporization lower than 150 J/g at boiling point and 1 atm, or 105 J/g at boiling point, and/or a vapor pressure greater than 0.01 kPa at 25° C., or 1 kPa at 25° C. In some instances, all or a portion of the third flame retardants can have heat capacities higher than 500 J/kg° C. at 25° C., higher than 800 J/kg° C. at 25° C., or higher than 1000 J/kg° C. at 25° C. A third flame retardant with an elevated heat capacity can absorb additional heat from the electrode assembly when in the liquid state.

In some instances, the second liquid phase includes one or more high boiling point flame retardants with a boiling point above 180° C. in addition to the one or more low boiling point flame retardants and/or the third liquid phase includes one or more high boiling point flame retardants with a boiling point above 180° C. in addition to the one or more low boiling point flame retardants. The combination of flame retardants with different boiling points permits the second liquid phase to address different mechanisms by which the volatility of the battery occurs. For instance, a short in the battery causes the temperature of the battery to rapidly rise to very high temperatures. As a result, one or more second flame retardants with a boiling point above 180° C. and/or one or more third flame retardants with a boiling point above 180° C. may be effective at addressing a short in the battery although less effective at addressing volatility occurring at lower temperatures.

In some instances, the second liquid phase and/or the third liquid phase includes one or more relief flame retardants that may enhance existing safety features of the battery. For instance, many batteries include safety features such as a shut-down separator and one or more relief valves such as a burst disc and/or a current interruption device, and/or a positive temperature coefficient (PTC) device. A shut-down separator is selected to prevent or reduce passage of ions through the separator once the temperature in the battery rises above a threshold temperature. A relief valve and/or current interruption device reduce the volatility of a battery by disrupting electrical connections in the battery and/or reduce battery temperature by releasing excessive internal pressure. A PTC device disrupts electrical connections in a battery by increasing the internal resistance of the battery when the temperature exceeds a threshold. Relief valves, current interruption devices and/or positive temperature coefficients are generally triggered before the threshold temperature associated with the shut-down separator is reached. However, in some instances, the pressure in the battery is not sufficient to trigger these safety mechanisms before the threshold temperature is reached. The one or more relief flame retardants can be selected to increases the effectiveness of these relief valves. For instance, one or more of the relief flame retardants can have a boiling point between the boiling point of the electrolyte and the boiling point of temperature threshold of the shut-down separator. The boiling point of common electrolytes is generally about 80° C.-150° C. while the temperature threshold of common separators is generally about 130° C.-180° C. at 1 atm. Accordingly, a relief flame retardant can have a boiling point greater than 60° C., or 80° C. and/or less than 120° C., 150° C., 160° C. or 180° C. Because the boiling point of the relief flame retardant can be less than the temperature threshold of the shut-down separator, the relief flame retardant begins to boil and increase the pressure in the battery before the temperature threshold of the shut-down separator is achieved. The increase in pressure provided by the relief flame retardant can be sufficient to ensure triggering of the relief valve before the temperature threshold of the shut-down separator is achieved. A low boiling point flame retardant can serve as a relief flame retardant, a high boiling point flame retardant can serve as a relief flame retardant, the second liquid phase can include one or more relief flame retardants in addition to one or more high boiling point flame retardants and/or in addition to one or more low boiling point flame retardants, or the third liquid phase can include one or more relief flame retardants in addition to one or more high boiling point flame retardants and/or in addition to one or more low boiling point flame retardants.

The second liquid phase can have a density that is higher than the density of the third liquid phase. Additionally, the second liquid phase can be in contact with the first liquid phase. The one or more second flame retardants can be more miscible in the second liquid phase than in the first liquid phase. In some instances, the one or more second flame retardants are substantially immiscible in the first liquid phase. As a result, the one or more second flame retardants can be substantially isolated in the second liquid phase. As is noted above, the second liquid phase can be located outside of the active region of the electrode assembly. Substantial isolation of the one or more second flame retardants in a second liquid phase that is located outside of the active region substantially isolates the one or more second flame retardants from the redox reactions at the electrodes. As a result, the one or more second flame retardant can include or consist of one or more compounds that would adversely affect the performance of the battery if exposed to the redox reactions in substantial concentrations. Additionally or alternately, the amount, volume and/or concentration of one or more components of the second liquid phase can be increased beyond a concentration that would adversely affect the performance of the battery when present in the active region of the electrode assembly. As a result, the amount of second flame retardant present in the battery can be increased to the level that provides the desired level of thermal protection without substantially affecting the performance of the battery.

The third liquid phase can be in contact with the second liquid phase and in contact with the first liquid phase. Alternately, the third liquid phase can be in contact with the second liquid phase but out of contact the first liquid phase. When the third liquid phase is in contact with the second liquid phase, the one or more third flame retardants can be more miscible in the third liquid phase than in the second liquid phase. In some instances, the one or more third flame retardants are substantially immiscible in the second liquid phase. When the third liquid phase is not in contact with the first liquid phase, this arrangement can substantially isolate the one or more third flame retardants in the third liquid phase. The one or more third flame retardants can also be substantially isolated in the third liquid phase when the third liquid phase contacts the first liquid phase. For instance, when the third liquid phase is in contact with the second liquid phase, the one or more third flame retardants can be more miscible in the third liquid phase than in the second liquid phase and more miscible in the third liquid phase than in the first liquid phase. In some instances, the one or more third flame retardants are substantially immiscible in the second liquid phase and in the first liquid phase.

As noted above, the third liquid phase can be located outside of the active region of the electrode assembly. Substantial isolation of the one or more third flame retardants in a third liquid phase that is located outside of the active region substantially isolates the one or more third flame retardants from the redox reactions at the electrodes. As a result, the one or more third flame retardant can include or consist of one or more compounds that would adversely affect the performance of the battery if exposed to the redox reactions in substantial concentrations. Additionally or alternately, the amount, volume and/or concentration of one or more components of the third liquid phase can be increased beyond a concentration that would adversely affect the performance of the battery when present in the active region of the electrode assembly. As a result, the amount of third flame retardant present in the battery can be increased to the level that provides the desired level of thermal protection without substantially affecting the performance of the battery.

In some instances, the first liquid phase includes one or more first flame retardants. Because the first liquid phase is located in the active region of the electrode assembly, the one or more first flame retardants can be located in the active region of the electrode assembly. The presence of the one or more first flame retardants in the active region of the electrode assembly allows the one or more first flame retardants to suppress heat and/or delay propagation of thermal reactions that occur within the active region. In the event that the battery failure extends beyond the active region, the suppression of the thermal reactions provided by the one or more first flame retardant can be sufficient to enhance the effect of the one or more second flame retardants and/or the one or more third flame retardants beyond the effect that the one or more second flame retardants and the one or more third flame retardants would have alone. As a result, the first, second, and third flame retardants can act together to enhance the safety of the battery.

When the first liquid phase includes one or more first flame retardants, the one or more first flame retardants can be more miscible in the electrolyte than in the second liquid phase and/or than in the third liquid phase. In some instances, the one or more first flame retardants are substantially immiscible in the second liquid phase and/or in the third liquid phase. As a result, the one or more first flame retardants can be substantially isolated in the first liquid phase. As noted above, the first liquid phase is positioned in the active region of the electrode assembly. Accordingly, the one or more first flame retardants can be substantially isolated in the first liquid phase.

All or a portion of the first flame retardants can be selected to have a boiling point or a decomposition temperature greater than 60° C., or 80° C. and/or less than 120° C., or 180° C. at 1 atm. As noted above, flame retardants with boiling points in these ranges permit use of the battery within the normal operating temperatures while addressing volatility issues. Additionally or alternately, all or a portion of the one or more first flame retardants can be selected to have a boiling point or a decomposition temperature that is equal to the boiling temperature of the electrolyte +/−30° C. at 1 atm or +/−15° C. at 1 atm. The boiling point of most organic electrolytes is generally around 130° C. As a result, in some instances, the first flame retardant and/or the second flame retardant have a boiling point or a decomposition temperature of 130° C.+/−30° C. at 1 atm or 130° C.+/−15° C. at 1 atm. These conditions can enhance distribution of a first flame retardant in the interior of the battery before catastrophic behavior occurs. For instance, evaporation of a flame retardant and the electrolyte at about the same temperature encourages mixing of the electrolyte and first flame retardant vapors.

When the first liquid phase includes one or more first flame retardants, the elevated level of safety protection provided by the second flame retardant permits the first flame retardant to be used at concentrations that are sufficiently low that they do not reduce battery performance when present in the active region of the electrode assembly. Additionally or alternately, the one or more first flame retardants can be one that does not substantially affect the performance of the battery but is a less effective flame retardant than other retardants which may adversely affect performance when present in the active region of the electrode assembly.

Figure 1A:
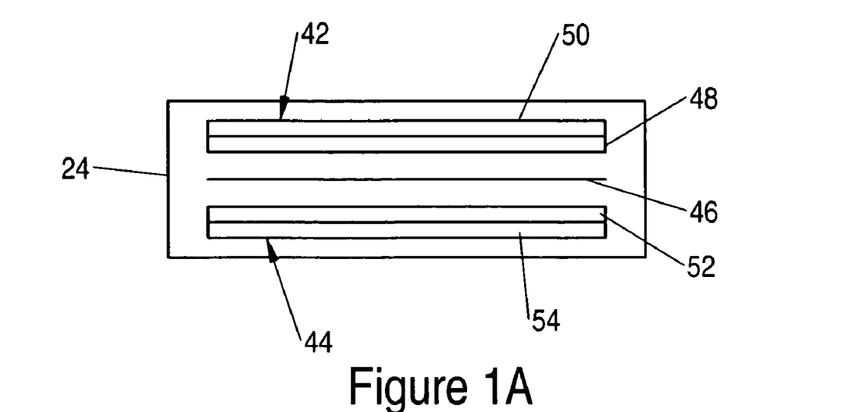
FIG. 1A is a cross section of a battery having an electrode assembly that includes an anode and a cathode.

FIG. 1A is a schematic view of a suitable battery. The battery includes a case 24 that holds an electrode assembly including a separator 46 between a cathode 42 and an anode 44. The cathode 42 includes a cathode medium 48 on a cathode substrate 50. The anode 44 includes an anode medium 52 on an anode substrate 54.

Figure 1B:
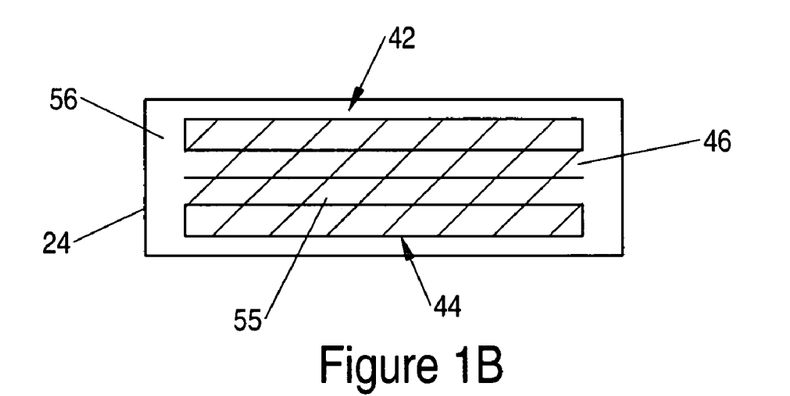
FIG. 1B illustrates the active region of the electrode assembly shown in FIG. 1A.

The electrode assembly of FIG. 1A has an active region illustrated by the slanted lines in FIG. 1B. Energy is generated in the active region by redox reactions at the electrodes accompanied by migration of ions between the electrodes. The active region can be defined by the perimeter of the electrode assembly. Accordingly, the active region generally includes the electrodes and the region between the electrodes through which the ions migrate. As a result, the active region can include all or a portion of the separator.

Figure 1C:
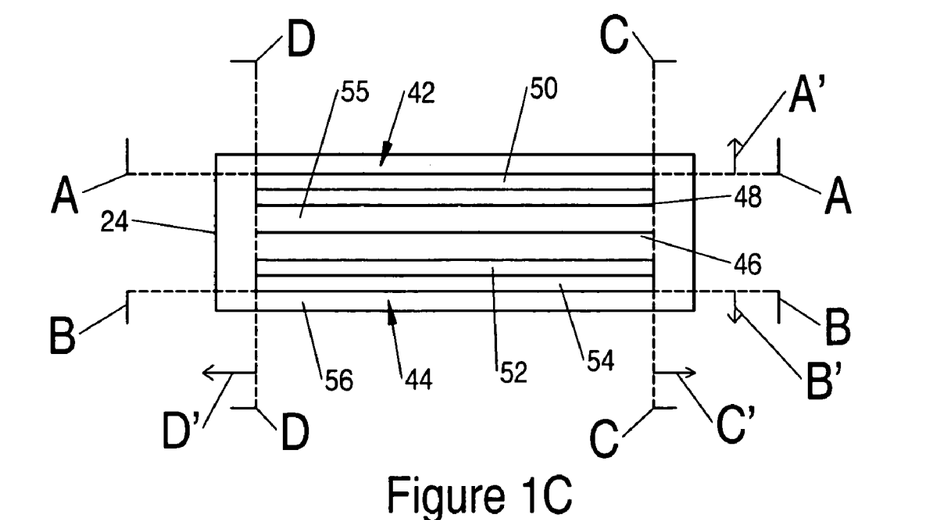
FIG. 1C illustrates possible locations for a first liquid phase relative to a second liquid phase in the battery of FIG. 1A.

A first liquid phase 55 is located in the active region. For instance, the first liquid phase 55 can be located between the electrodes in the electrode assembly. The first liquid phase 55 includes or consists of an electrolyte that activates the anode and the cathode. The electrolyte includes at least one or more salts in a solvent. Additional liquid phases 56 are primarily located outside of the active region. For instance, a second liquid phase and a third liquid phase can be positioned between the electrode assembly and the case. FIG. 1C illustrates possible locations of the additional phases 56 in the battery case 24. One or more of the additional phases 56 can be located above the active region, below the active region, and/or in one or more locations adjacent to the lateral sides of the active region. For instance, the dashed line extending between the brackets labeled A includes the upper perimeter of the active region. As is evident from arrow labeled A', one or more of the additional phases 56 can be positioned at one or more locations at or above the dashed line extending between the brackets labeled A. The dashed line extending between the brackets labeled B include the lower perimeter of the active region. As is evident from the arrow labeled B', one or more the additional phases 56 can be positioned at one or more locations at or below the dashed line extending between the brackets labeled B. The dashed line extending between the brackets labeled C include the right perimeter of the active region. As is evident from the arrow labeled C', one or more of the additional phases can be positioned at one or more locations at or to the right of the dashed line extending between the brackets labeled C. The dashed line extending between the brackets labeled D include the left perimeter of the active region. As is evident from the arrow labeled D', one or more of the additional phases 56 can be positioned at one or more locations at or to the left of the dashed line extending between the brackets labeled D. In some instances, the additional phases 56 are substantially excluded from the active region of the electrode assembly.

Figure 2A:
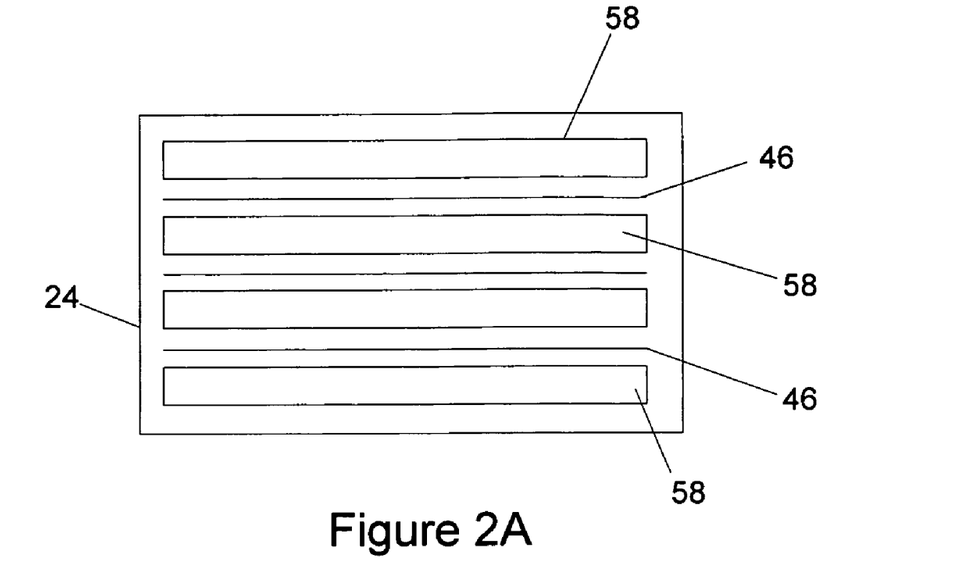
FIG. 2A is a cross section of a battery having an electrode assembly that includes a plurality of anodes and a plurality of cathodes.
Figure 2B:
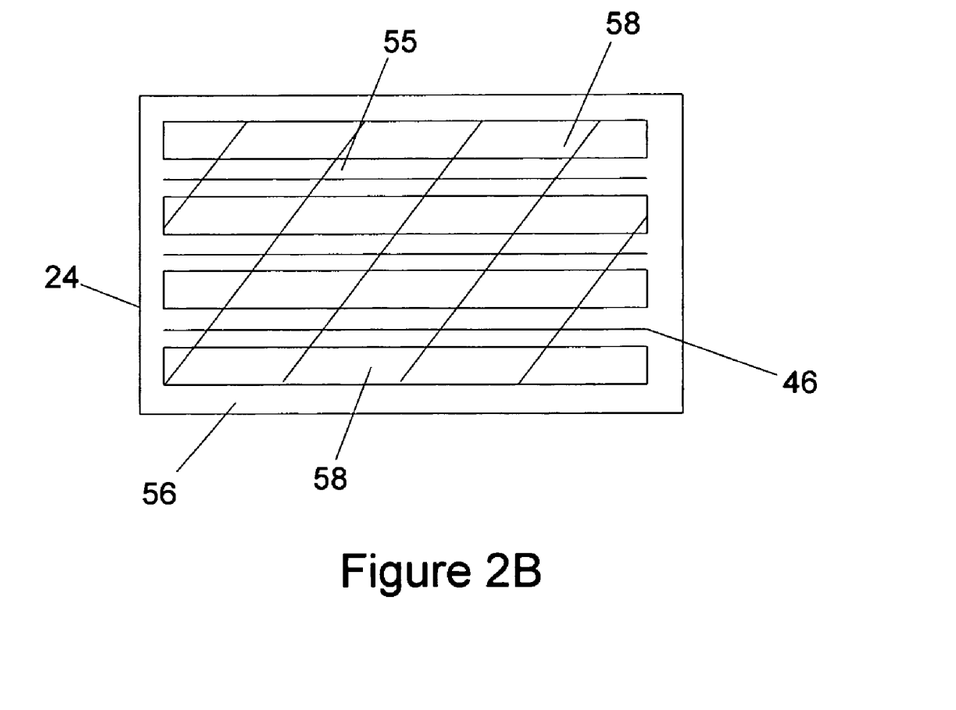
FIG. 2B illustrates the active region of the electrode assembly shown in FIG. 2A.

FIG. 2A is a cross section of battery having a case 24 that houses an electrode assembly having a stack of electrodes 58. Separators 46 are positioned between adjacent electrodes 58. Electrode stacks generally include anodes alternating with cathodes. The active region of the electrode assembly is illustrated by the slanted lines in FIG. 2B. The first liquid phase 55 is positioned in the active region. For instance, the first liquid phase can be located between the electrodes in the electrode assembly. The additional phases 56 are positioned outside of the active region. In some instances, the additional phases 56 are substantially excluded from the active region.

Figure 3A:
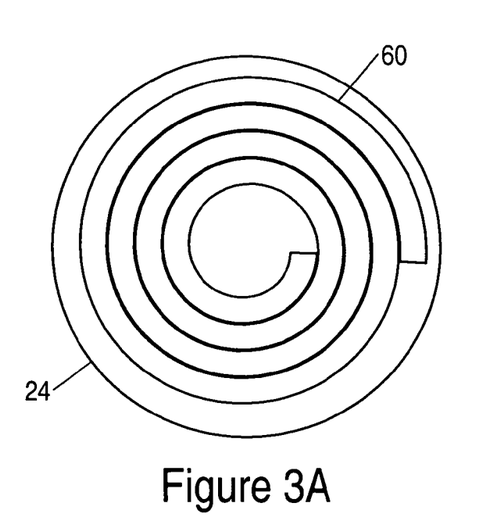
FIG. 3A is a cross section of a battery having a wound electrode assembly.
Figure 3B:
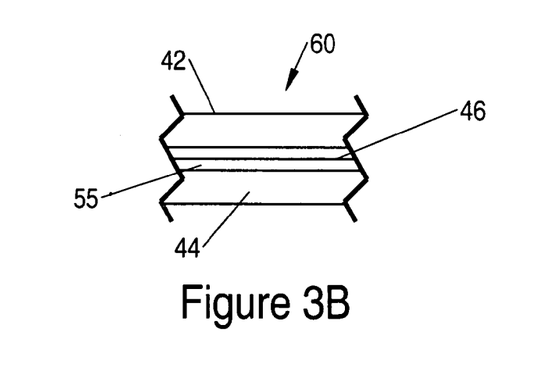
FIG. 3B is a cross section of the electrode assembly shown in FIG. 3A.
Figure 3C:
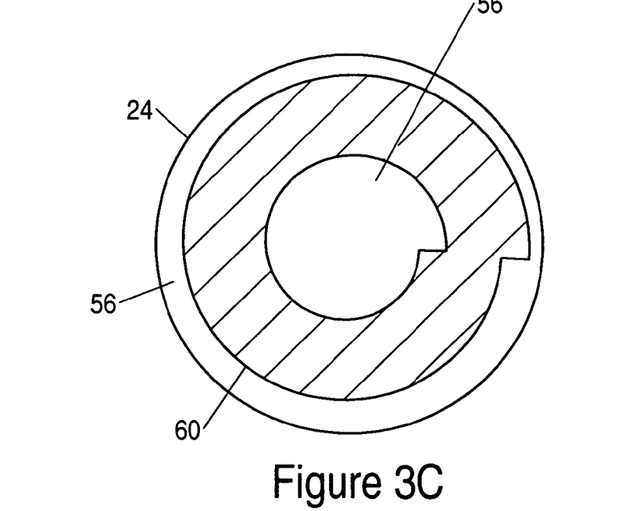
FIG. 3C illustrates the active region of the electrode assembly shown in FIG. 3A.

FIG. 3A through FIG. 3C illustrate a battery having a case 24 that houses an electrode assembly 60. FIG. 3A is a cross section of the battery. The battery includes a wound type electrode assembly 60, which is often called a "jelly roll." FIG. 3B illustrates a section of the electrode assembly 60. The electrode assembly 60 includes a separator 46 positioned between an anode 44 and a cathode 42. The electrode assembly 60 includes an active region illustrated by the slanted lines in FIG. 3C. The first liquid phase 55 is positioned in the active region of the electrode assembly such that the electrolyte included in the first liquid phase activates the electrodes of the electrode assembly. For instance, the first liquid phase can be located between the electrodes in the electrode assembly as illustrated in FIG. 3B. The additional phases 56 can be positioned outside of the active region as illustrated in FIG. 3C. For instance, the one or more of the additional phases 56 can be positioned in the center of the wound electrode assembly and/or between the wound electrode assembly and the case. In some instances, the additional phases 56 are substantially excluded from the active region.

As is evident from the above discussions, one or more of the additional phases 56 can be positioned in contact with an inactive side of electrodes where low levels of redox reaction and/or low levels of ion intercalation occur during discharge of the battery.

Figure 4A:
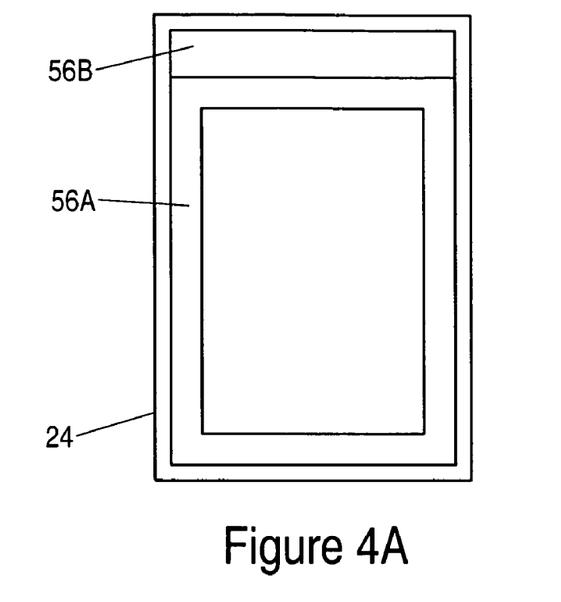
FIG. 4A is a cross section of a battery having an electrode assembly in a second liquid phase that is liquid-liquid separated from a third liquid phase. A portion of the second liquid phase is between the battery assembly and the third liquid phase.

The additional phases 56 in FIG. 1A through FIG. 3C can include the second liquid phase and the third liquid phase. FIG. 4A is a cross section of a battery having an electrode assembly in contact with a second liquid phase 56A that is liquid-liquid separated from a third liquid phase 56B. The electrode assembly can be any one of the electrode assemblies illustrated in FIG. 1A through FIG. 3C or can be an electrode assembly with a different structure. The second liquid phase 56A can have a higher density than the third liquid phase 56B. Accordingly, the third liquid phase 56B is shown as positioned between the second liquid phase 56A and the top of the battery. A portion of the second liquid phase 56A is positioned between the battery assembly and the third liquid phase 56B. As a result, the third liquid phase 56B does not contact the electrode assembly 61. Since the first liquid phase is positioned in the active region (not shown) of the electrode assembly, the third liquid phase 56B also does not contact the first liquid phase.

Figure 4B:
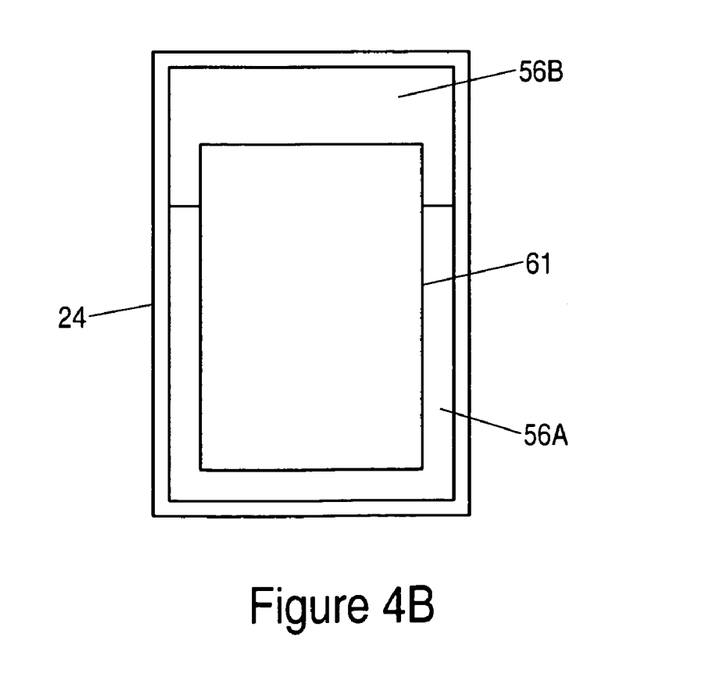
FIG. 4B is a cross section of a battery having an electrode assembly in a second liquid phase that is liquid-liquid separated from a third liquid phase. The third liquid phase is in contact with the electrode assembly.

In some instances, the third liquid phase is in contact with the first liquid phase. FIG. 4B is a cross section of a battery where the third liquid phase 56B is positioned in contact with the electrode assembly 61. The electrode assembly can be any one of the electrode assemblies illustrated in FIG. 1A through FIG. 3C or can be an electrode assembly with a different structure. Because the first liquid phase is positioned in the active region of the electrode assembly, the third liquid phase 56B is in contact with the first liquid phase. The third liquid phase 56B need not extend to a position below the top of the electrode assembly and can be flush with the top of the electrode assembly.

The above description of FIG. 1A through FIG. 4B disclose the second liquid phase 56A and/or the third liquid phase 56B as being excluded from the active region of the electrode assembly. However, in some instances, the effects of surface tension and/or the curvature of a meniscus that can form between the first liquid phase 55 and the second liquid phase 56A and/or between the third liquid phase 56B and the first liquid phase 55 can draw portions of the second liquid phase 56A and/or the third liquid phase 56B into the active region of the electrode assembly. As a result, in some instances, more than 85%, more than 90%, or more than 95% of the second liquid phase 56A volume is located outside of the active region of the electrode assembly and/or more than 85%, more than 90%, or more than 95% of the third liquid phase volume is located outside of the active region of the electrode assembly.

The battery can include one or more safety features to ensure that operation of the battery is reduced or stopped in the event of battery stress or failure. An example of a suitable safety feature is a shut-down separator. A shut-down separator is selected to prevent or reduce passage of ions through the separator once the temperature in the battery rises above a threshold temperature. As a result, a shut-down separator can cease operation of the battery once the temperature in the battery exceeds the temperature threshold.

An example shut-down separator includes openings such as pores, perforations or apertures through which the ions pass during discharge of the battery. The shut-down separator material can be selected such that the passage of the ions through the pores or openings is reduced or stopped once the threshold temperature is exceeded. For instance, the shut-down separator can be constructed from a material that begins to flow at the threshold temperature. The flow can completely or partially seal the openings in the separator and can accordingly reduce or prevent flow of ions through the openings. Examples of materials suitable for use as shut-down separators include, but are not limited to, polyolefins such polyethylene, polypropylene and combinations thereof.

Figure 5A:
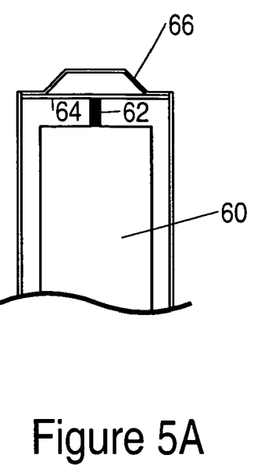
FIG. 5A is a cross section of a battery having a current interruption device configured to interrupt current flow from a battery once the pressure in the battery exceeds a threshold pressure. The battery is illustrated before the threshold pressure is exceeded.
Figure 5B:
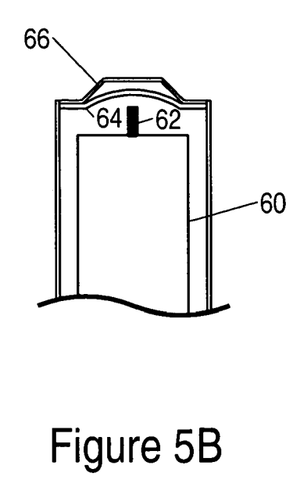
FIG. 5B illustrates the battery of FIG. 5A after the threshold pressure is exceeded.

The batteries can include a relief valve such as a current interruption device or a burst disc. An example current interruption device interrupts current flow from a battery once the pressure in the battery exceeds a threshold pressure. FIG. 5A and FIG. 5B illustrate operation of a current interruption device. FIG. 5A is a cross section of a battery before the threshold pressure is reached. FIG. 5B is a cross section of the battery after the threshold pressure is reached.

The battery includes a tab 62, an electrode assembly 60, an electrically conducting diaphragm 64 and a cap 66 that serves as a terminal for the battery. The tab is in electrical communication with one or more anodes in the electrode assembly or with one or more cathodes in the electrode assembly. During operation of the battery, the diaphragm 64 is in contact with the tab 62 as illustrated in FIG. 5A. The diaphragm 64 is electrically conductive and provides electrical communication between the cap 66 and the tab 62. In the event the pressure in the battery rises above the threshold pressure, the diaphragm 64 deforms such that the contact between the tab and the diaphragm is broken. The break in contact between the tab 62 and the diaphragm 64 stops the flow of current through the battery.

Figure 6A:
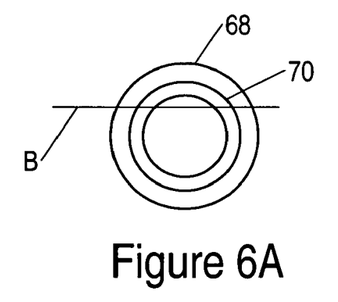
FIG. 6A is a side-view of a burst disc.
Figure 6B:
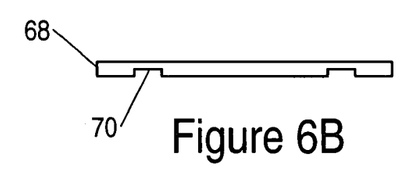
FIG. 6B is a cross-section of the burst disc shown in FIG. 6A taken along the line labeled B.

The batteries can also include a burst disc. A burst disc is a member of the battery casing that includes one or more regions of weakness. The one or more regions of weakness cause the disc to rupture at a pressure below the pressure at which the disc would rupture without the region(s) of weakness. Accordingly, the member having the regions of weakness ruptures before the battery would rupture without use of the burst disc. The early disruption prevents the pressure in the battery pressure from reaching dangerous levels. The regions of weakness can be defined by holes, perforations or openings. FIG. 6A and FIG. 6B illustrate an example of a burst disc 68. FIG. 6A is a side-view of the burst disc 68. FIG. 6B is a cross-section of the burst disc 68 shown in FIG. 6A taken along the line labeled B. A recess 70 extends into the burst disc 68. The recess 70 serves as a region of weakness along which the disc can burst.

Figure 6C:
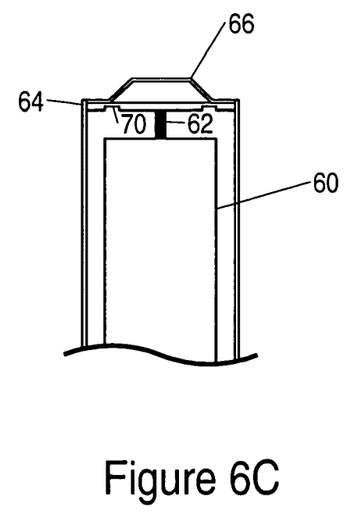
FIG. 6C is a cross section of a battery including a burst disc as illustrated in FIG. 6A.

A battery can include both a burst disc and a current interruption device. FIG. 6C is a cross section of the battery shown in FIG. 6A with a diaphragm that serves as a burst disc. A recess extends into the diaphragm. The recess surrounds a region of the diaphragm as illustrated in FIG. 6A and FIG. 6B. In the event that pressure in the battery rises above a threshold pressure, the diaphragm ruptures at the recess. As a result, the diaphragm ruptures before the pressure in the battery rises to a dangerous level. Although the perforations are shown in the diaphragm, the perforations can also be included in the cap 66 or terminal. Accordingly, the cap 66 or terminal can also serve as a burst disc. Additionally, the disc need not be round. The region of weakness need not define a round area on the disc and can be a line, a triangle or have a different shape. Further, the shape of the disc that includes the one or more regions of weakness need not have a round shape. For instance, the disc can be square, rectangular or have another shape.

Additionally or alternately, a battery can include a positive temperature coefficient (PTC) device. A PTC device is usually a material with temperature dependent electrical conductivity. For instance, the conductivity can decrease as the temperature increases. This material can be coated between the active material and the substrate in an electrode or mixed in a slurry with the active material and coated on the substrate along with the active material. Additionally or alternately, the material can be employed as any of the other current carrying battery connections. Examples of a material suitable for use as a PTC include, but are not limited to, high-density polyethylene (melting point: 130 to 140.degree.), low-density polyethylene (melting point: 110 to 112.degree. C.), a polyurethane elastomer (melting point: 140-160.degree. C.), and polyvinyl chloride (melting point: about 145.degree. C.).

The battery pack can include one or more of the above features. For instance, the battery can include one or two or three safety features selected from a group consisting of, a shut-down separator, a current interruption device, a positive temperature coefficient and a burst disc. In some instances, the battery includes a shut-down separator and a current interruption device or a positive temperature coefficient or a burst disc. In some instances, the battery includes a shut-down separator, a current interruption device, a positive temperature coefficient and a burst disc.

As noted above, the second liquid phase includes or consists of the one or more second flame retardants. The one or more second flame retardants can have a low miscibility in the first liquid phase and/or in the third liquid phase. In some instances, the one or more second flame retardants are substantially immiscible in the first liquid phase and/or in the third liquid phase. The first liquid phase and the one or more second flame retardants can be selected such that the first liquid phase is saturated with the one or more second flame retardants before one, more than one, or all of second flame retardant reaches 1 wt % of the first liquid phase, 5 wt % of the first liquid phase, or 10 wt % of the first liquid phase. Additionally or alternately, the first liquid phase and the one or more second flame retardants can be selected such that the first liquid phase is saturated with the one or more second flame retardants once or before one, more than one, or all of the second flame retardants reaches a concentration of 200 ppm in the first liquid phase. The third liquid phase and the one or more second flame retardants can be selected such that the third liquid phase is saturated with the one or more second flame retardants before one, more than one, or all of second flame retardant reaches 1 wt % of the third liquid phase, 5 wt % of the third liquid phase, or 10 wt % of the third liquid phase. Additionally or alternately, the third liquid phase and the one or more second flame retardants can be selected such that the third liquid phase is saturated with the one or more second flame retardants once or before one, more than one, or all of the second flame retardants reaches a concentration of 200 ppm in the third liquid phase. In some instances, one or more of the second flame retardants are substantially present in the first liquid phase and/or in the third liquid phase.

Suitable second flame retardants include a fully or partially fluorinated compound selected from the group consisting of: alkanes, ethers, ketones, and amines substituted with one or more alkyl groups. The compound can be more than 60% fluorinated, more than 80% fluorinated. In some instances, the thermal suppression provided by the above components increases as the level of halogenation increases. As a result, preferred compounds can be fully fluorinated. Accordingly, suitable second flame retardants include perfluoro compounds and perfluorocarbons. In some instances, the second phase and the one or more second flame retardants exclude ethers and specifically exclude fully or partially halogenated ethers. In some instances, the second flame retardants are selected such that evaporation of the second flame retardant increases the heat capacity of the gaseous atmosphere in the battery above the heat capacity of the gaseous atmosphere before evaporation of the flame retardant.

In some instances, a second flame retardant is a cyclic perfluoroalkane or a linear perfluoroalkane. Suitable perfluoroalkanes include, but are not limited to, perfluoropentane, perfluorohexane, perfluoroheptane, and perfluoroctane. Suitable perfluoroalkanes can be substituted or unsubstituted. In one example, a perfluoroalkane is substituted with one or more perfluoroalkyl groups. An example of a cyclic perfluoroalkane substituted with two perfluoroalkyl groups includes perfluoro-1,3-dimethylcyclohexane.

In some instances, a second flame retardant is a ketone represented by R'(C=O)R" wherein R' is a perfluoroalkyl group and R" is a perfluoroalkyl group or an alkyl group. In some instances, the ketone is a perfluoroketone. An example of a suitable perfluoroketone includes, but is not limited to, dodecafluoro-2-methylpentan-3-one.

In some instances, a second flame retardant is a linear or cyclic ether that is fully or partially fluorinated. Suitable cyclic ethers include perfluorocyclic ethers such as $C_8F_{16}O$. Suitable linear ethers are represented by R'OR" wherein R' is a perfluoroalkyl group and R" is a perfluoroalkyl group or an alkyl group. The linear ether can be a perfluoroether or a segregated hydrofluoroether. Examples of suitable segregated hydrofluoroethers include, but are not limited to, methoxy-heptafluoropropane, methoxy-nonafluorobutane, ethoxy-nonafluorobutane, and perfluorohexylmethylether. The ethers can be substituted with one or more perfluoroalkyl groups and/or one or more perfluoroalkoxy groups. An example of a substituted segregated hydrofluoroether includes 2-trifluoromethyl-3-ethoxydodecofluorohexane.

In some instances, a second flame retardant is an amine substituted with one or more perfluoroalkyl groups. The perfluoroalkyl can all be the same or can be different. The amine can include a perfluoroalkyl substituent and two other substituents that are each a perfluoroalkyl group or an alkyl group. The amine can be a perfluoroalkylamine including perfluorotrialkylamines such as perfluorotripentylamine, perfluorotributylamine, and perfluorotripropylamine. Another example of a suitable amine includes perfluoro-n-dibutylmethylamine.

As noted above, the third liquid phase includes or consists of the one or more third flame retardants. The one or more third flame retardants can have a low miscibility in the first liquid phase and/or in the second liquid phase. In some instances, the one or more third flame retardants are substantially immiscible in the first liquid phase and/or in the second liquid phase. The first liquid phase and the one or more third flame retardants can be selected such that the first liquid phase is saturated with the one or more third flame retardants before one, more than one, or all of third flame retardant reaches 1 wt % of the first liquid phase, 5 wt % of the first liquid phase, or 10 wt % of the first liquid phase. Additionally or alternately, the first liquid phase and the one or more third flame retardants can be selected such that the first liquid phase is saturated with the one or more third flame retardants once or before one, more than one, or all of the third flame retardants reaches a concentration of 200 ppm in the first liquid phase. The second liquid phase and the one or more third flame retardants can be selected such that the second liquid phase is saturated with the one or more third flame retardants before one, more than one, or all of third flame retardant reaches 1 wt % of the second liquid phase, 5 wt % of the second liquid phase, or 10 wt % of the second liquid phase. Additionally or alternately, the second liquid phase and the one or more third flame retardants can be selected such that the second liquid phase is saturated with the one or more third flame retardants once or before one, more than one, or all of the third flame retardants reaches a concentration of 200 ppm in the second liquid phase. In some instances, one or more of the third flame retardants are substantially present in the first liquid phase and/or in the second liquid phase.

Suitable third flame retardants include a fully or partially fluorinated compound selected from the group consisting of: alkanes, ethers, ketones, and amines substituted with one or more alkyl groups. The compound can be more than 60% fluorinated, more than 80% fluorinated. In some instances, the thermal suppression provided by the above components increases as the level of halogenation increases. As a result, preferred compounds can be fully fluorinated. Accordingly, suitable third flame retardants include perfluoro compounds and perfluorocarbons. In some instances, one or more of the third flame retardants are selected such that evaporation of the third flame retardant increases the heat capacity of the gaseous atmosphere in the battery above the heat capacity of the gaseous atmosphere before evaporation of the flame retardant. In some instances, the third phase and the one or more third flame retardants exclude ethers and specifically fully or partially halogenated ethers.

In some instances, a third flame retardant is a cyclic perfluoroalkane or a linear perfluoroalkane. Suitable perfluoroalkanes include, but are not limited to, perfluoropentane, perfluorohexane, perfluoroheptane, and perfluoroctane. Suitable perfluoroalkanes can be substituted or unsubstituted. In one example, a perfluoroalkane is substituted with one or more perfluoroalkyl groups. An example of a cyclic perfluoroalkane substituted with two perfluoroalkyl groups includes perfluoro-1,3-dimethylcyclohexane.

In some instances, a third flame retardant is a ketone represented by R'(C=O)R" wherein R' is a perfluoroalkyl group and R" is a perfluoroalkyl group or an alkyl group. In some instances, the ketone is a perfluoroketone. An example of a suitable perfluoroketone includes, but is not limited to, dodecafluoro-2-methylpentan-3-one.

In some instances, a third flame retardant is a linear or cyclic ether that is fully or partially fluorinated. Suitable cyclic ethers include perfluorocyclic ethers such as $C_8F_{16}O$. Suitable linear ethers are represented by R'OR" wherein R' is a perfluoroalkyl group and R" is a perfluoroalkyl group or an alkyl group. The linear ether can be a perfluoroether or a segregated hydrofluoroether. Examples of suitable segregated hydrofluoroethers include, but are not limited to, methoxy-heptafluoropropane, methoxy-nonafluorobutane, ethoxy-nonafluorobutane, and perfluorohexylmethylether. The ethers can be substituted with one or more perfluoroalkyl groups and/or one or more perfluoroalkoxy groups. An example of a substituted segregated hydrofluoroether includes 2-trifluoromethyl-3-ethoxydodecofluorohexane.

In some instances, a third flame retardant is an amine substituted with one or more perfluoroalkyl groups. The perfluoroalkyl can all be the same or can be different. The amine can include a perfluoroalkyl substituent and two other substituents that are each a perfluoroalkyl group or an alkyl group. The amine can be a perfluoroalkylamine including perfluorotrialkylamines such as perfluorotripentylamine, perfluorotributylamine, and perfluorotripropylamine. Another example of a suitable amine includes perfluoro-n-dibutylmethylamine.

The characteristics of various compounds that are suitable for use as a second flame retardant or as a third flame retardants are presented below in Table 1. The characteristics can be employed to select the combinations of one or more second flame retardants and one or more third flame retardants that are employed in the battery. The perfluorinated alkanes listed in Table 1 can have large hydrophobic side chains that make them substantially immiscible in conventional battery electrolytes. The oxygen-containing compounds listed in Table 1 may be slightly more miscible in conventional electrolyte, although still significantly immiscible. As a result when mixed together, these compounds will form different phases depending on their relative miscibility with the electrolyte. Compounds with similar density will tend to aggregate together at the same level in the battery while compounds with lower density will tend to aggregate at a lower levels.

The second liquid phase can include a plurality of the second flame retardants and/or the third liquid phase can include a plurality of the third flame retardants. Suitable mixtures of the flame retardants for use in the second liquid phase or for use in the third liquid phase include, but are not limited to: mixtures of perfluoroalkanes; mixtures of amines substituted with one or more perfluoroalkyl groups, mixtures of perfluoroketones, mixtures of perfluoroethers, mixtures of segregated hydrofluoroethers, mixtures of one or more perfluoroalkanes and one or more perfluorocyclic ethers, a mixture of perfluoro-n-butylamine and perfluoro-n-dibutylmethylamine, mixtures of one or more perfluoroalkanes and one or more segregated hydrofluoroethers, mixtures of one or more perfluoroalkanes and/or mixtures of one or more amine substituted with one or more perfluoroalkyl groups and/or perfluoroketone and/or perfluoroethers and/or mixtures of one or more segregated hydrofluoroethers

TABLE 1

| | Density (g/cc) | Boiling Point (° C. at 1 atm) | Heat Capacity (J/kg ° C. at 25° C.) | Heat of Vaporization (J/g at boiling point and 1 atm) | Vapor Pressure (kPa) |
|---|---|---|---|---|---|
| Perfluoropentane | 1.63 | 30 | 1045-1100 | 100-103 | 81.3 |
| Methoxy-heptafluoropropane | 1.40 | 34 | 1300 | 142 | 64.6 |
| Dodecafluoro-2-methylpentan-3-one | 1.60 | 49 | 1045-1100 | 88 | 40.4 |
| Perfluorohexane | 1.68 | 56 | 1045-1100 | 88-92 | 30.9 |
| Methoxy-nonafluorobutane | 1.51 | 61 | 1180 | 112 | 26.8 |
| Ethoxy-nonafluorobutane | 1.42 | 76 | 1220 | 119 | 15.7 |
| Perfluoroheptane | 1.73 | 80 | 1045-1100 | 79-80 | 10.5 |
| Perfluorohexylmethylether | 1.66 | 97 | 1140 | 102 | 6 |
| Perfluoroctane | 1.76 | 101 | 1100 | 94 | 3.8 |
| Perfluorotripropylamine | 1.82 | 128 | 1200 | 75-82 | 1.5 |
| 2-trifluoromethyl-3-ethoxydodecofluorohexane | 1.61 | 130 | 1130 | 88.5 | 2.1 |
| Perfluorotributylamine | 1.88 | 174 | 1045-1100 | 70-71 | 0.17 |
| Perfluorotripentylamine | 1.94 | 215 | 1045-1100 | 67-69 | <0.01 |
| Perfluorotributylamine mixed with Perfluoro-n-dibutylmethylamine | 1.87 | 155 | 1045-1100 | 68-71 | 1.7 |

The first liquid phase includes or consists of the battery electrolyte. The first liquid phase can exclude a first flame retardant or can include one or more first flame retardants. In some instances, one or more first flame retardant is located in the one or more anodes, and/or the one or more cathodes and/or the separator in addition to being included in the electrolyte and/or as an alternative to being located in the electrolyte. When the first flame retardant is included in the electrolyte, the first flame retardant can have a volume % in the electrolyte, at room temperature of greater than 0.1%, 1%, and/or less than 25%, or 15% and preferably in a range of 3% to 10%, or in a range of 3% to 5%.

The first flame retardant can be substantially excluded from the second liquid phase and/or the third liquid phase or can be present in the second liquid phase and/or the third liquid phase. Selecting the composition of the first flame retardant and the second liquid phase such that the first flame retardant has a low miscibility in the second liquid phase can help to isolate the first flame retardant in the first liquid phase. In some instances, the second liquid phase and the one or more first flame retardants are selected such that the second liquid phase is saturated with the one or more first flame retardants before one, more than one, or all of first flame retardant reaches 1 wt % of the first liquid phase, 5 wt % of the first liquid phase, or 10 wt % of the first liquid phase. As noted above, the third liquid phase can contact the first liquid phase. In these instances, the composition of the first flame retardant and the third liquid phase can be selected such that the first flame retardant has a low miscibility in the third liquid phase. This arrangement can help to isolate the first flame retardant in the first liquid phase. In some instances, the third liquid phase and the one or more first flame retardants are selected such that the third liquid phase is saturated with the one or more first flame retardants before one, more than one, or all of first flame retardant reaches 1 wt % of the first liquid phase, 5 wt % of the first liquid phase, or 10 wt % of the first liquid phase. In some instances, one or more of the first flame retardants are substantially present in the second liquid phase and/or in the third liquid phase.

Suitable first flame retardants include, but are not limited to, phosphazenes including cyclic phosphazenes such as cyclotriphosphazene. The cyclic phosphazenes can be fully or partially halogenated. For instance, the cyclic phosphazenes can be fully or partially fluorinated. Additionally or alternately, the cyclic phosphazenes can have one or more substituents selected from a group consisting of linear or cyclic alkyl groups, alkoxy groups, cycloalkoxy groups, and aryloxy groups. The substituents can be unhaloghenated, fully halogenated or partially halogenated. In some instances, the cyclic phosphazenes are fully substituted with halogens and substituents selected from a group consisting of linear or cyclic alkyl groups, alkoxy groups, cycloalkoxy groups, and aryloxy groups. In some instances, all or a portion of the phosphazene is selected such that evaporation of the at least one of the phosphazene increases the heat capacity of the gaseous atmosphere in the battery above the heat capacity of the gaseous atmosphere before evaporation of the flame retardant.

A suitable cyclic phosphazene for use as the first flame retardant includes a cyclotriphosphazene. An example of a cyclotriphosphazene that is fully substituted with fluorines and a single alkoxy substituent is represented by:

An example of a cyclotriphosphazene that is fully substituted with fluorines and a plurality of alkoxy substituents is represented by:

An example of a cyclotriphosphazene that is fully substituted with fluorines and an aryloxy substituent is represented by:

These phosphazenes are generally miscible in conventional electrolytes as a result of their relatively low viscosity (commonly less than 100 cP at 25° C., and more preferably less than 20 cP at 25° C.).

The electrolyte includes one or more salts in a solvent. The solvent can be a non-aqueous solvent such. The solvent can be an organic liquid. The solvent can include or consist of one or more first organic solvents and/or one or more second organic solvents. In some instance, the first solvent is a low viscosity solvent and the second solvent is a high permittivity solvent. Examples of the first solvent include, but are not limited to, linear and cyclic ethers and dialkyl carbonates such as tetrahydrofuran (THF), methyl acetate (MA), diglyme, triglyme, tetraglyme, dimethyl carbonate (DMC), 1,2-dimethoxyethane (DME), 1,2-diethoxyethane (DEE), 1-ethoxy, 2-methoxyethane (EME), ethyl methyl carbonate (EMC), methyl propyl carbonate, ethyl propyl carbonate, diethyl carbonate (DEC), dipropyl carbonate, and mixtures thereof. Examples of second solvents include, but are not limited to, cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, y-butyrolactone (GBL), and mixtures thereof. An example solvent includes a mixture of EC and DEC. A preferred electrolyte includes one or more first solvents and one or more second solvents. Suitable volume ratios of the one or more first solvents to the one or more second solvents include, but are not limited to, ratios in a range of: 30:70 to 80:20. In a preferred example the ratio is in a range of 30:70 to 70:30.

The principles of the invention are preferably applied to electrolytes that include organic solvents as a result of the volatility associated with these solvents. However, the electrolyte can include other solvents associated with lower levels of volatility such as polysiloxanes, tetrasiloxane, trisloxanes, disiloxanes, and silanes. Examples of suitable polysiloxane electrolytes are disclosed in U.S. patent application Ser. No. 10/810,019, filed on Mar. 25, 2004, entitled "Polysiloxane for Use in Electrochemical Cells," and incorporated herein in its entirety. Examples of suitable tetrasiloxane and tetrasiloxane electrolytes are disclosed in U.S. Provisional Patent Application Ser. No. 60/543,951, filed on Feb. 11, 2004, entitled "Siloxanes;" and in U.S. patent application Ser. No. 10/971,926, filed on Oct. 21, 2004, and entitled "Electrochemical Device Having Electrolyte Including Tetrasiloxane;" and in U.S. patent application Ser. No. 11/056,868, filed on Feb. 10, 2005, and entitled "Electrochemical Device Having Electrolyte Including Tetrasiloxane;" each of which is incorporated herein in its entirety. Examples of suitable trisiloxanes and trisiloxane electrolytes are disclosed in U.S. Provisional Patent Application Ser. No. 60/543,951, filed on Feb. 11, 2004, entitled "Siloxanes;" and U.S. Provisional Patent Application Ser. No. 60/542,017, filed on Feb. 4, 2004, entitled "Nonaqueous Electrolyte Solvents for Electrochemical Devices;" and U.S. Provisional Patent Application Ser. No. 60/543,898, filed on Feb. 11, 2004, entitled "Siloxane Based Electrolytes for Use in Electrochemical Devices;" and in U.S. patent application Ser. No. 10/971,913, filed on Oct. 21, 2004, and entitled "Electrochemical Device Having Electrolyte Including Trisiloxane;" and in U.S. patent application Ser. No. 11/056,867, filed on Feb. 10, 2005, and entitled "Electrochemical Device Having Electrolyte Including Trisiloxane;" each of which is incorporated herein in its entirety. Examples of suitable disiloxanes and disiloxane electrolytes are disclosed in U.S. Provisional Patent Application Ser. No. 60/543,951, filed on Feb. 11, 2004, entitled "Siloxanes;" and U.S. Provisional Patent Application Ser. No. 60/542,017, filed on Feb. 4, 2004, entitled "Nonaqueous Electrolyte Solvents for Electrochemical Devices;" and U.S. Provisional Patent Application Ser. No. 60/543,898, filed on Feb. 11, 2004, entitled "Siloxane Based Electrolytes for Use in Electrochemical Devices," and in U.S. patent application Ser. No. 10/971,507, filed on Oct. 21, 2004, and entitled "Electrochemical Device Having Electrolyte Including Disiloxane;" and in U.S. patent application Ser. No. 11/056,869, filed on Feb. 10, 2005, and entitled "Electrochemical Device Having Electrolyte Including Disiloxane;" each of which is incorporated herein in its entirety. Examples of suitable silanes and silane electrolytes are disclosed in U.S. Provisional Patent Application Ser. No. 60/601,452, filed on Aug. 13, 2004, entitled "Electrolyte Including Silane for Use in Electrochemical Devices;" and in U.S. patent application Ser. No. 10/977,313, filed on Oct. 28, 2004, and entitled "Electrolyte Including Silane for Use in Electrochemical Device;" and in U.S. patent application Ser. No. 11/056,869, filed on Feb. 10, 2005, and entitled "Electrolyte Including Silane for Use in Electrochemical Device;" each of which is incorporated herein in its entirety.

Suitable salts for use with the electrolyte include, but are not limited to, alkali metal salts including lithium salts. Examples of lithium salts include $LiClO_4$, $LiBF_4$, $LiAsF_6$, $LiPF_6$, $LiSbF_6$, $LiCF_3SO_3$, $LiC_6F_5SO_3$, $LiC(CF_3SO_2)_3$, $LiN(SO_2C_2F_5)_2$, $LiN(SO_2CF_3)_2$, $LiAlCl_4$, $LiGaCl_4$, LiSCN, $LiO_2$, $LiO_3SCF_3$, $LiO_2CCF_3$, $LiSO_6F$, $LiB(C_6H_5)_4$, Li-imide, lithium alkyl fluorophosphates, organoborate salts including lithium bis(oxalato)borate (LiBOB) and lithium difluoro oxalato borate (LiDfOB), Li-methide, and mixtures thereof. Examples of suitable organoborate salts are disclosed in U.S. Patent Application Ser. No. 60/565,211, filed on Apr. 22, 2004, entitled "Organoborate Salt in Electrochemical Device Electrolytes" and incorporated herein in its entirety. Preferred salts include $LiPF_6$. The electrolyte can be prepared such that the salt has a concentration greater than 0.1 M, 0.5 M or greater than 0.7 M and/or less than 1.5 M, less than 2 M, or less than 5 M. For instance, the electrolyte can include 0.8 M to 1.5 M $LiAsF_6$ or $LiPF_6$ in a 50:50 mixture, by volume, of propylene carbonate and 1,2-dimethoxyethane. Another example of the electrolyte includes electrolyte 1.2 M LiPF6 in a 30:70 by volume mixture of EC and DEC.

The electrolyte can optionally include one or more additives such as passivation additives. Suitable passivation additives include, but are not limited to, carbonates having one or more unsaturated substituents. For instance, suitable passivation additives include unsaturated and unsubstituted cyclic carbonates such as vinyl carbonate (VC); cyclic alkylene carbonates having one or more unsaturated substituents such as vinyl ethylene carbonate (VEC), and o-phenylene carbonate (CC, $C_7H_4O_3$); cyclic alkylene carbonates having one or more halogenated alkyl substituents such as ethylene carbonate substituted with a trifluormethyl group (trifluoropropylene carbonate, TFPC); linear carbonates having one or more unsaturated substituents such as ethyl 2-propenyl ethyl carbonate ($C_2H_5CO_3C_3H_5$); saturated or unsaturated halogenated cyclic alkylene carbonates such as fluoroethylene carbonate (FEC) and chloroethylene carbonate (CIEC). Other suitable passivation additives include, acetates having one or more unsaturated substituents such as vinyl acetate (VA). Other suitable passivation additives include cyclic alkyl sulfites and linear sulfites. For instance, suitable passivation additives include unsubstituted cyclic alkyl sulfites such as ethylene sulfite (ES); substituted cyclic alkylene sulfites such as ethylene sulfite substituted with an alkyl group such as a methyl group (propylene sulfite, PS); linear sulfites having one or more one more alkyl substituents and dialkyl sulfites such as dimethyl sulfite (DMS) and diethyl sulfite (DES). Other suitable passivation additives include halogenated-gamma-butyrolactones such as bromo-gamma-butyrolactone (BrGBL) and fluoro-gamma-butyrolactone (FGBL).

The passivation additives can include or consist of one or more passivation additives selected from the group consisting of: dimethyl sulfite (DMS), diethyl sulfite (DES), bromo-gamma-butyrolactone (BrGBL), fluoro-gamma-butyrolactone (FGBL), vinyl carbonate (VC), vinyl ethylene carbonate (VEC), ethylene sulfite (ES), CC, trifluoropropylene carbonate (TFPC), 2-propenyl ethyl carbonate, fluoroethylene carbonate (FEC), chloroethylene carbonate (CIEC), vinyl acetate (VA), propylene sulfite (PS), 1,3 dimethyl butadiene, styrene carbonate, phenyl ethylene carbonate (PhEC), aromatic carbonates, vinyl pyrrole, vinyl piperazine, vinyl piperidine, vinyl pyridine, and mixtures thereof. In another example, the electrolyte includes or consists of one or more passivation additives selected from the group consisting of vinyl carbonate (VC), vinyl ethylene carbonate (VEC), ethylene sulfite (ES), propylene sulfite (PS), and phenyl ethylene carbonate (PhEC).

Suitable separators 46 include, but are not limited to, polyethylene, fabrics woven from fluoropolymeric fibers including polyvinylidene fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, polytetrafluoroethylene membrane, polypropylene/polyethylene membrane commercially available under the designation CELGARD (Celanese Plastic Company, Inc.), and a polyethylene membrane commercially available from Tonen Chemical Corp. Suitable shut-down separators include, but are not limited to, polyethylene, and polypropylene.

When the first flame retardant is to be included in a separator, the separator can be soaked in the first flame retardant or coated with the first flame retardant before assembly of the battery. Alternately, the first flame retardant can penetrate into the separator from the electrolyte after the assembly of the battery.

A suitable material for the anode substrate includes, but is not limited to, titanium, a titanium alloy, stainless steel, nickel, copper, tungsten, tantalum or alloys thereof.

The anode medium 52 includes or consists of one or more anode active materials and a binder. The anode active material can include or consist of a metal selected from Groups IA, IIA and IIIB of the Periodic Table of the Elements. Examples of these anode active materials include lithium, sodium, potassium, etc., and their alloys and intermetallic compounds including, for example, Li—Si, Li—Al, Li—B and Li—Si—B alloys and intermetallic compounds. Alternative suitable anode active materials include lithium alloys such as a lithium-aluminum alloy. The greater the amounts of aluminum present by weight in the alloy, however, the lower the energy density of the cell. Other alternative suitable anode active materials include graphite or other carbon, $Cu_6Sn_5$, $Cu_2Sb$, MnSb, other metal alloys, $Li_4Ti_5O_{12}$, silica alloys, or mixtures of suitable anode active materials.

In some instances, the anode consists of the anode medium. Accordingly, the anode medium can serve as the anode. For instance, the anode can include or consist of lithium metal or a lithium metal alloy. Lithium metal can be sufficiently conductive that an anode substrate is not necessary.

When an anode is to be formed from materials in a powdered or granular form, an anode can be generated by mixing the components of the anode medium in a slurry. Coating the slurry on the anode substrate material and drying the slurry so as to form the anode medium on the substrate. When the first flame retardant is to be included in an anode, the first flame retardant can be included in the slurry. Alternately or additionally, the anode can be soaked in the first flame retardant or coated with the first flame retardant. Alternately, the first flame retardant can penetrate into the anode from the electrolyte after the assembly of the battery.

Suitable cathode substrates 50 include, but are not limited to, stainless steel, titanium, tantalum, platinum, aluminum, gold, nickel, or an alloy thereof.

The cathode medium 48 includes or consists of a plurality of cathode active materials and one or more binders. Suitable binders include, but are not limited to, carboxymethyl cellulose (CMC), fluoropolymer, polytetrafluoroethylene or polyvinyldiene fluoride. In some instances, the cathode medium includes a conductive diluent to further increase conductivity if needed. Suitable diluents include, but are not limited to, acetylene black, carbon black and/or graphite or metallic powders such as powdered nickel and aluminum. In some instances, the cathode medium excludes a conductive diluent.

Suitable cathode active materials include, but are not limited to, fluorinated carbon ($CF_x$), lithium vanadium oxide such as the lithium vanadium oxide represented by $Li_{1+y}V_3O_8$, polypyrrole, $H_2V_3O_8$, metal vanadium oxides represented by $M_zH_{1-z}V_3O_8$, $CuCl_2$, silver vanadium oxides such as $Ag_2V_4O_{11}$, $LiCuCl_2$, $TiS_2$, $MoO_2$, $MoS_2$, $MnO_2$, $V_2O_5$, $V_6O_{13}$, $H_2V_3O_8$, $LiCoO_2$, $LiNiO_2$, $LiFePO_4$, $LiMnO_2$, $LiCoNiMnO_2$, $LiCoNiM'O_2$, and combinations thereof. In some instances, the cathode active materials include or consist of one or more active materials.

To make a cathode, a mixture of the one or more cathode active materials and water are mixed together to form a slurry. The slurry is applied to the cathode substrate at the desired locations and dried. In some instances, a conductor such as carbon black and/or a binder such as a solution of PVDF in n-methylpyrolidone (NMP) are added to the slurry. A cathode substrate such as an aluminum substrate is coated with the slurry, dried by evaporation, and then rolled to the desired thickness. When the first flame retardant is to be included in a cathode, the first flame retardant can be included in the slurry. Alternately or additionally, the cathode can be soaked in the first flame retardant or coated with the first flame retardant. Alternately, the first flame retardant can penetrate into the cathode from the electrolyte after the assembly of the battery.

Examples of suitable cathode constructions are set forth in U.S. patent application Ser. No. 10/984,434, filed on Nov. 8, 2004, entitled "Battery Having High Rate and High Capacity Capabilities;" and in U.S. patent application Ser. No. 10/478,920, filed on Nov. 19, 2003, and entitled "Battery;" each of which is incorporated herein in its entirety.

A battery can be constructed by generating an electrode assembly that includes a separator(s) positioned between adjacent electrodes. The electrode assembly is positioned in a battery case. The battery case is then at least partially filled with the first liquid phase such that the first liquid phase enters the active region of the electrode assembly. The case can be partially filled with the first liquid phase so as to leave additional space available in the case. In some instances, the first liquid phase penetrates into the electrode assembly over time so as to form additional space in the case. The second liquid phase can then be positioned in the space that is available in the battery case. After the addition to the second liquid phase, the third liquid phase can be positioned in the space that remains available in the battery case. For instance, the second liquid phase and/or the third liquid phase can be positioned between the electrode assembly and the walls of the case and/or the over the electrode assembly. In the case of prismatic cells, space is often available for the second liquid phase and/or the third liquid phase in the corners of the cell. Wound cells are often formed by winding the electrode assembly around a mandrel. If the mandrel is removed, the space that was previously occupied by the mandrel is often available for the second liquid phase and/or the third liquid phase. If the mandrel is hollow, the space inside the mandrel could be filled with the second liquid phase and/or the third liquid phase. Because the second liquid phase and the third liquid phase will separate on their own, in some instances, they can be added to the battery case concurrently.

Although the formation of the battery is disclosed in the context of placing the first liquid phase in the case before the second liquid phase and the third liquid phase, the second liquid phase and/or the third liquid phase can be placed in the case before the first liquid phase. In some instances, the positioning of the first liquid phase and the second liquid phase in the case can be alternated. For instance, the second liquid phase can be positioned in the case followed by positioning of the first liquid phase in the case followed by positioning of the second liquid phase in the case. The electrode assembly can be positioned in the case after the first liquid phase or the second liquid phase is positioned in the case. For instance, the second liquid phase can be positioned in the bottom of the case and the electrode assembly can then be positioned in the case such that the electrode assembly is positioned over the second liquid phase.

Additional information about the formation of a cell having a second liquid phase that includes a flame retardant is described in U.S. patent application Ser. No. 10/034,316, filed on Dec. 28, 2001, entitled "Electrolyte System and Energy Storage Device Using Same;" and in U.S. patent application Ser. No. 10/498,603, filed on Jun. 9, 2004, and entitled "Electrolyte System and Energy Storage Device;" and in International Patent Application number PCT/US02/39451, filed on Dec. 10, 2002, and entitled "Electrolyte System and Energy Storage Device Using Same;" and in U.S. patent application Ser. No. 11/271,473 filed on concurrently herewith, and entitled "Flame Retardant Battery;" and U.S. Provisional Patent Application Ser. No. 60/668,878; filed on Apr. 5, 2005; entitled "Flame Retardant Battery;" each of which is incorporated herein in its entirety.

Other embodiments, combinations and modifications of this invention will occur readily to those of ordinary skill in the art in view of these teachings. Therefore, this invention is to be limited only by the following claims, which include all such embodiments and modifications when viewed in conjunction with the above specification and accompanying drawings.

We claim:

1. A battery, comprising:
an electrode assembly including one or more anodes and one or more cathodes;
a second liquid phase outside of an active region of the electrode assembly, the second liquid phase including one or more second flame retardants;
a third liquid phase outside of the active region and in contact with the second liquid phase, the third liquid phase including one or more third flame retardants; and
a first liquid phase in the active region of the electrode assembly and in contact with the second liquid phase, the first liquid phase including an electrolyte and having a density that is greater than a density of the third liquid phase.

2. The battery of claim 1, wherein the second liquid phase has a density that is greater than a density of the third liquid phase.

3. The battery of claim 1, wherein the first liquid phase has a density between a density of the second liquid phase and a density of the third liquid phase.

4. The battery of claim 1, wherein the first liquid phase is in contact with the third liquid phase.

5. The battery of claim 1, wherein the first liquid phase is out of contact with the third liquid phase.

6. The battery of claim 1, wherein the third liquid phase is positioned between a top of the battery and the electrode assembly.

7. The battery of claim 6, wherein the second liquid phase is positioned between the third liquid phase and a bottom of the battery.

8. The battery of claim 1, wherein at least one second flame retardant has a boiling point between 80° C. and 120° C. at 1 atm.

9. The battery of claim 8, wherein at least one second flame retardant has a boiling point between 120° C. and 180° C. at 1 atm.

10. The battery of claim 1, wherein at least one second flame retardant has a heat of vaporization lower than 150 J/g at boiling point and 1 atm, and a vapor pressure greater than 1 kPa at 25° C. and at least one second flame retardant has a heat of vaporization lower than 150 J/g at boiling point and 1 atm and a vapor pressure greater than 1 kPa at 25° C.

11. The battery of claim 1, wherein at least one third flame retardant has a boiling point between 120° C. and 180° C. at 1 atm.

12. The battery of claim 1, wherein at least one second flame retardant and/or at least one third flame retardant has a boiling point greater than 80° C. and less than a runaway temperature of the battery, the runaway temperature of the battery being determined from the self heating rate of the battery as generated from accelerated rate calorimetry.

13. The battery of claim 12, wherein at least one second flame retardant and/or at least one third flame retardant has a boiling point greater than the runaway temperature of the battery being determined from the self heating rate of the battery as generated from accelerated rate calorimetry.

14. The battery of claim 1, wherein at least one second flame retardant and/or at least one third flame retardant has a boiling point between 80° C. and 120° C. at 1 atm and at least one second flame retardant and/or at least one third flame retardant has a boiling point between 120° C. and 180° C.

15. The battery of claim 1, wherein at least one second flame retardant has a heat of vaporization lower than 150 J/g at boiling point and a vapor pressure greater than 1 kPa at 1 atm and at least one second flame retardant has a heat of vaporization lower than 150 J/g at boiling point and a vapor pressure greater than 1 kPa at 1 atm.

16. The battery of claim 1, wherein the electrode assembly includes a shut-down separator between an adjacent anode and an adjacent cathode, and at least one flame retardant selected from a group consisting of the one or more second flame retardants and the one or more third flame retardants has a boiling point between a threshold temperature of the shut-down separator and a boiling point of the electrolyte.

17. The battery of claim 1, wherein the second liquid phase and the third liquid phase are located substantially outside of the active region of the electrode assembly.

18. The battery of claim 1, wherein at least 90% of the second liquid phase and at least 90% of the second liquid phase is located outside of the active region of the electrode assembly.

19. The battery of claim 1, wherein the second liquid phase consists of the one or more second flame retardants.

20. The battery of claim 1, wherein the third liquid phase consists of the one or more third flame retardants.

21. The battery of claim 1, wherein the second liquid phase consists of the one or more second flame retardants and the third liquid phase consists of the one or more third flame retardants.

22. The battery of claim 1, wherein the first liquid phase is saturated with each of the one or more second flame retardants once or before the second flame retardant is 5 wt % of the first liquid phase.

23. The battery of claim 1, wherein first liquid phase is saturated with the each of the one or more second flame retardants once or before the second flame retardant is at a concentration of 200 ppm in the first liquid phase.

24. The battery of claim 1, wherein at least one of the third flame retardants is a perfluorocarbon.

25. The battery of claim 1, wherein at least one flame retardant selected from a group consisting of second flame retardants and third flame retardants is a fully or partially halogenated compound selected from a group consisting of alkanes, ethers, ketones, and amines substituted with one or more alkyl groups, and is also selected such that evaporation of the third flame retardant increases the heat capacity of the gaseous atmosphere in the battery above the heat capacity of the gaseous atmosphere before evaporation of the flame retardant.

26. The battery of claim 25, wherein at least one flame retardant selected from a group consisting of second flame retardants and third flame retardants is a ketone represented by R'(C=O)R" wherein R' is a perfluoroalkyl group and R" is a perfluoroalkyl group or an alkyl group.

27. The battery of claim 26, wherein at least one flame retardant selected from a group consisting of second flame retardants and third flame retardants is a perfluoroketone.

28. The battery of claim 26, wherein at least one flame retardant selected from a group consisting of second flame retardants and third flame retardants is dodecafluoro-2-methylpentan-3-one.

29. The battery of claim 25, wherein at least one flame retardant selected from a group consisting of second flame retardants and third flame retardants is an ether.

30. The battery of claim 29, wherein the ether is a perfluorocyclic ether.

31. The battery of claim 29, wherein the ether is represented by R'OR" wherein R' is a perfluoroalkyl group and R" is a perfluoroalkyl group or an alkyl group.

32. The battery of claim 29, wherein the ether is a segregated hydrofluoroether.

33. The battery of claim 32, wherein the segregated hydrofluoroether is selected from a group consisting of: methoxy-heptafluoropropane, methoxy-nonafluorobutane, ethoxy-nonafluorobutane, perfluorohexylmethylether, and 2-trifluoromethyl-3-ethoxydodecofluorohexane.

34. The battery of claim 25, wherein at least one flame retardant selected from a group consisting of second flame retardants and third flame retardants is an amine substituted with one or more perfluoroalkyl groups.

35. The battery of claim 34, wherein the amine is substituted with three perfluoroalkyl groups.

36. The battery of claim 35, wherein the amine is selected from a group consisting of perfluorotripentylamine, perfluorotributylamine, perfluorotripropylamine and perfluoro-n-dibutylmethylamine.

37. The battery of claim 25, wherein at least one flame retardant selected from a group consisting of second flame retardants and third flame retardants is an alkane.

38. The battery of claim 25, wherein at least one flame retardant selected from a group consisting of second flame retardants and third flame retardants is a perfluoroalkane.

39. The battery of claim 38, wherein the perfluoroalkane is selected from a group consisting of perfluoropentane, perfluorohexane, perfluoroheptane, perfluoroctane, and perfluoro-1,3-dimethylcyclohexane.

40. The battery of claim 1, wherein the first liquid phase includes one or more first flame retardants.

41. The battery of claim 40, wherein at least one first flame retardant is a phosphazene.

42. The battery of claim 40, wherein at least one first flame retardant is a cyclic phosphazene.

43. The battery of claim 40, wherein at least one first flame retardant is a halogenated cyclic phosphazene.

44. The battery of claim 40, wherein the boiling temperature of at least one first flame retardant is between 80° C. and 180° C. at 1 atm.

45. The battery of claim 40, wherein the boiling temperature of at least one first flame retardant is the boiling temperature of the electrolyte +/−15° C. at 1 atm.

46. The battery of claim 40, wherein at least one first flame retardant is a cyclotriphosphazene that is fully substituted with halogens and one or more substituents selected from a group consisting of alkyl groups, alkoxy groups, cycloalkoxy groups, and aryloxy groups.

47. The battery of claim 40, wherein at least one first flame retardant is represented by or 48. The battery of claim 40, wherein at least one first flame retardant is in a range of 3% to 15% of the electrolyte volume.

49. The battery of claim 40, wherein at least one first flame retardant is in a range of 3% to 5% of the electrolyte volume.

50. A battery, comprising:
an electrode assembly including one or more anodes and one or more cathodes;
a second liquid phase outside of an active region of the electrode assembly, the second liquid phase including one or more second flame retardant;
a third liquid phase outside of the active region and in contact with the second liquid phase, the third liquid phase including one or more third flame retardants; and
a first liquid phase in the active region of the electrode assembly and in contact with the second liquid phase, the first liquid phase including an electrolyte having a density that is greater than a density of the third liquid phase.

51. The battery of claim 50, wherein the second liquid phase has a density that is greater than a density of the third liquid phase.

52. The battery of claim 51, wherein the electrolyte has a density between a density of the second liquid phase and a density of the third liquid phase.

53. A battery, comprising:
an electrode assembly including one or more anodes and one or more cathodes;
a second liquid phase outside of an active region of the electrode assembly, the second liquid phase including one or more second flame retardants selected from a group consisting of alkanes, ethers, ketones, and amines substituted with one or more alkyl groups where the compound is more than 60% fluorinated;
a third liquid phase outside of the active region and in contact with the second liquid phase, the third liquid phase including one or more third flame retardants selected from a group consisting of alkanes, ethers, ketones, and amines substituted with one or more alkyl groups where the compound is more than 60% fluorinated; and
a first liquid phase in the active region of the electrode assembly and in contact with the second liquid phase, the first liquid phase including an electrolyte having a density between a density of the second liquid phase and a density of the third liquid phase.

54. A method of assembling a battery, comprising:
positioning an electrode assembly in a battery case, the electrode assembly including one or more anodes and one or more cathodes;
positioning a first liquid phase in the battery case, the first liquid phase including an electrolyte;
positioning in the battery case a second liquid phase such that the second liquid phase and the first liquid phase liquid-liquid separate with the first liquid phase in an active region of the electrode assembly and in contact with the second liquid phase, the second liquid phase including one or more second flame retardants; and
positioning in the battery case a third liquid phase such that the third liquid phase and the second liquid phase liquid-liquid separate with the second liquid phase and the third liquid phase located outside of the active region, the third liquid phase including one or more third flame retardants.

55. The method of claim 54, wherein the second liquid phase and the third liquid phase are concurrently positioned in the battery case.

56. The method of claim 54, wherein the second liquid phase and the third liquid phase are sequentially positioned in the battery case.

* * * * *